(12) United States Patent
Chamulak et al.

(10) Patent No.: US 6,408,739 B1
(45) Date of Patent: Jun. 25, 2002

(54) PNEUMATIC CYLINDER WITH INTERNAL LIQUID DAMPENING MEANS

(75) Inventors: Steven Chamulak, Canton; Michael A. Ferkany, White Lake, both of MI (US)

(73) Assignee: ACE Controls, Inc., Farmington, MI (US)

( * ) Notice: Subject to any disclaimer, the term of this patent is extended or adjusted under 35 U.S.C. 154(b) by 0 days.

(21) Appl. No.: 09/650,921

(22) Filed: Aug. 30, 2000

Related U.S. Application Data

(60) Provisional application No. 60/176,774, filed on Jan. 19, 2000.

(51) Int. Cl.[7] .................................................. F15B 15/22
(52) U.S. Cl. ................................. 92/9; 92/11; 92/85 B
(58) Field of Search ............................ 92/9, 10, 11, 80, 92/82, 85 B

(56) References Cited

U.S. PATENT DOCUMENTS 3,830,139 A * 8/1974 Wachsman et al. ............... 92/9
3,905,278 A * 9/1975 Ourdouillie ...................... 92/10

FOREIGN PATENT DOCUMENTS

SU 706578 * 12/1979 .................. 92/85 B

* cited by examiner

Primary Examiner—F. Daniel Lopez
(74) Attorney, Agent, or Firm—Charles W. Chandler

(57) ABSTRACT

A pneumatic cylinder having internal hydraulic dampening device for cushioning the motion of a pneumatic piston (44) at its end of stroke. The hydraulic device includes a pair of hydraulic pistons (50, 52) cooperating with a pair of hydraulic cylinders to form a pair of hydraulic chambers (58, 64), which communicate with each other by a restricted flow passage (74). When the pneumatic piston nears its end of stroke, one of the hydraulic pistons is moved to compress the corresponding hydraulic chamber, forcing hydraulic fluid through the restricted flow passage, to the other hydraulic chamber. The flow of hydraulic fluid through the restricted flow passage slows the pneumatic piston, thereby cushioning the end of stroke motion. The restricted flow passage can include a plurality of flow passages which are sequentially closed by pins (136, 138, 140, 142) connected to one of the hydraulic pistons, as the hydraulic piston moves, to vary the restriction in the flow passage.

6 Claims, 5 Drawing Sheets

PNEUMATIC CYLINDER WITH INTERNAL LIQUID DAMPENING MEANS

This application claims the benefit of provisional application No. 60/176,774, filed Jan. 19, 2000.

BACKGROUND AND SUMMARY OF THE INVENTION

This invention is related to an industrial pneumatic cylinder having an internal, liquid dampening means for cushioning the end of the (cylinder) stroke.

Industrial pneumatic cylinders commonly use some means for cushioning the cylinder at the end of the piston stroke. Conventional pneumatic cylinders have an internal pneumatic device intended to cushion the end of the piston stroke; however, such devices are only satisfactory in a controlled atmosphere, that is, where temperature and humidity is controlled. Certain industries, such as the medical industry, and some printing industries control the air for other reasons. Such cylinder cushions appear to be satisfactory in such an environment. However, in a general industrial atmosphere, pneumatic cylinders using air for cushioning the shock at the end of the stroke are generally unsatisfactory. Consequently, the practice is to use an external hydraulic shock absorber to cushion the end of the stroke. Such an arrangement is bulky and not always reliable.

The broad purpose of the present invention is to provide a pneumatic cylinder having an internal hydraulic shock absorber, which cushions the end of the stroke.

Typically, a pneumatic cylinder has an internal piston mounted on a rod in a barrel that provides a pressure chamber. As the piston rod is reciprocated, the piston moves toward either the head or the cap, its motion being controlled by regulating either the pressurized incoming air, or the air exhaust. It is important in some applications to incorporate a retarding or cushioning device at either one or both ends of the stroke.

In the preferred embodiment of the invention, a pneumatic piston carries a pair of open cylinders, one facing the cylinder head, the other facing the cylinder cap. Two floating shock pistons are slidably mounted on the piston rod on opposite sides of the pneumatic piston and slide in the open cylinders to form a pair of hydraulic (cushioning) chambers. As the pneumatic piston approaches one end of its stroke, the shock piston between the end of the pneumatic chamber and the pneumatic piston causes oil in one of the cushioning chambers to pass through a metering passage toward the cushioning chamber on the opposite end of the pneumatic piston. The size of the metering passage controls the final deceleration of the pneumatic piston.

When the piston moves in the opposite direction, the other shock piston functions in a similar way. Thus, the end of each stroke of the pneumatic piston is controlled by an internal hydraulic shock absorber. Several structures are disclosed for metering the oil passing between the cushioning chambers.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
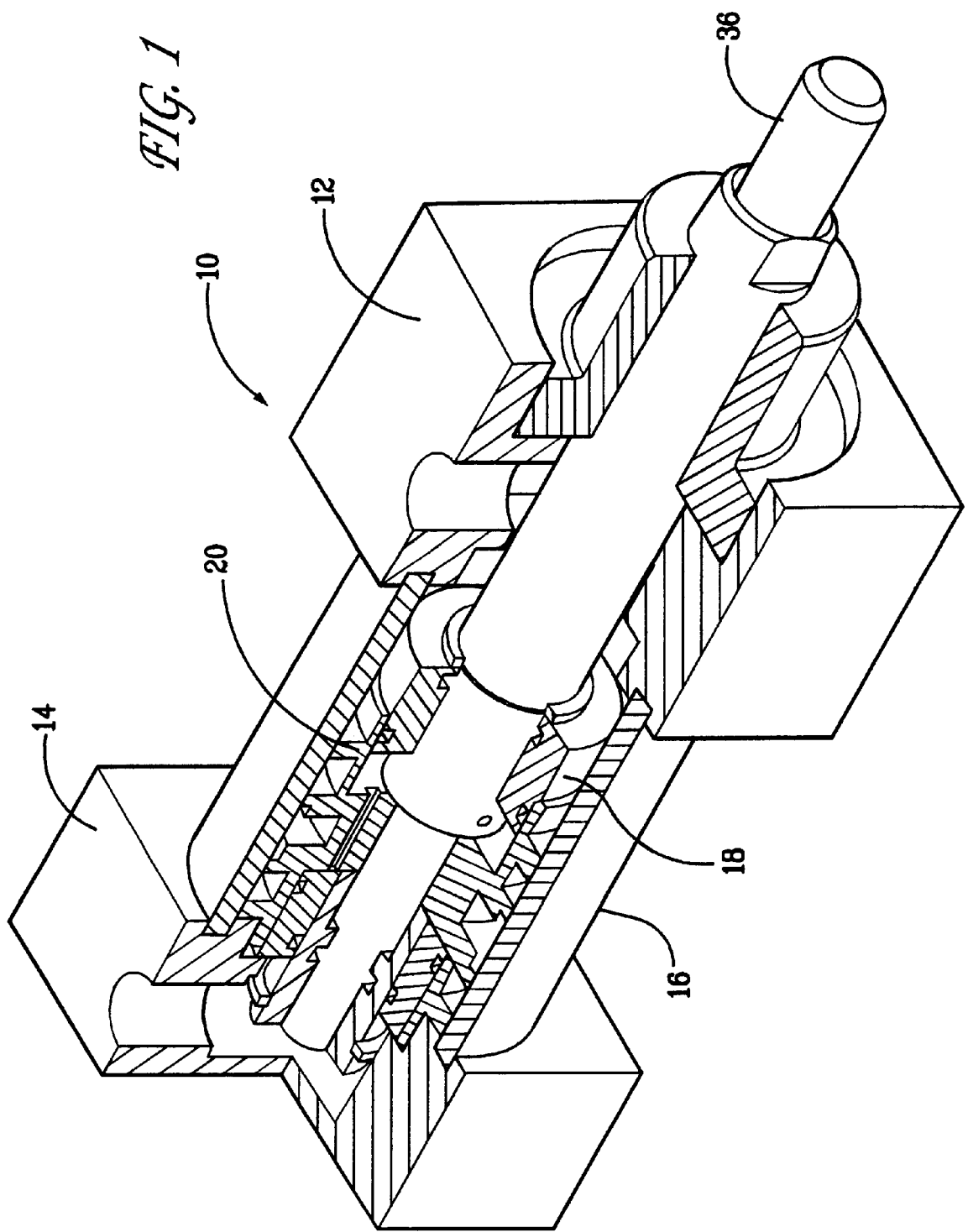
FIG. 1 is a perspective, sectional view of a pneumatic cylinder illustrating the preferred embodiment of the invention.

FIG. 1 is a sectional view illustrating a preferred pneumatic cylinder 10 having an internal hydraulic cushioning device illustrating the invention. The cylinder includes head 12, cap 14, and a cylindrical barrel 16 mounted between the head and cap in the manner well known to those skilled in the art.

Figure 2:
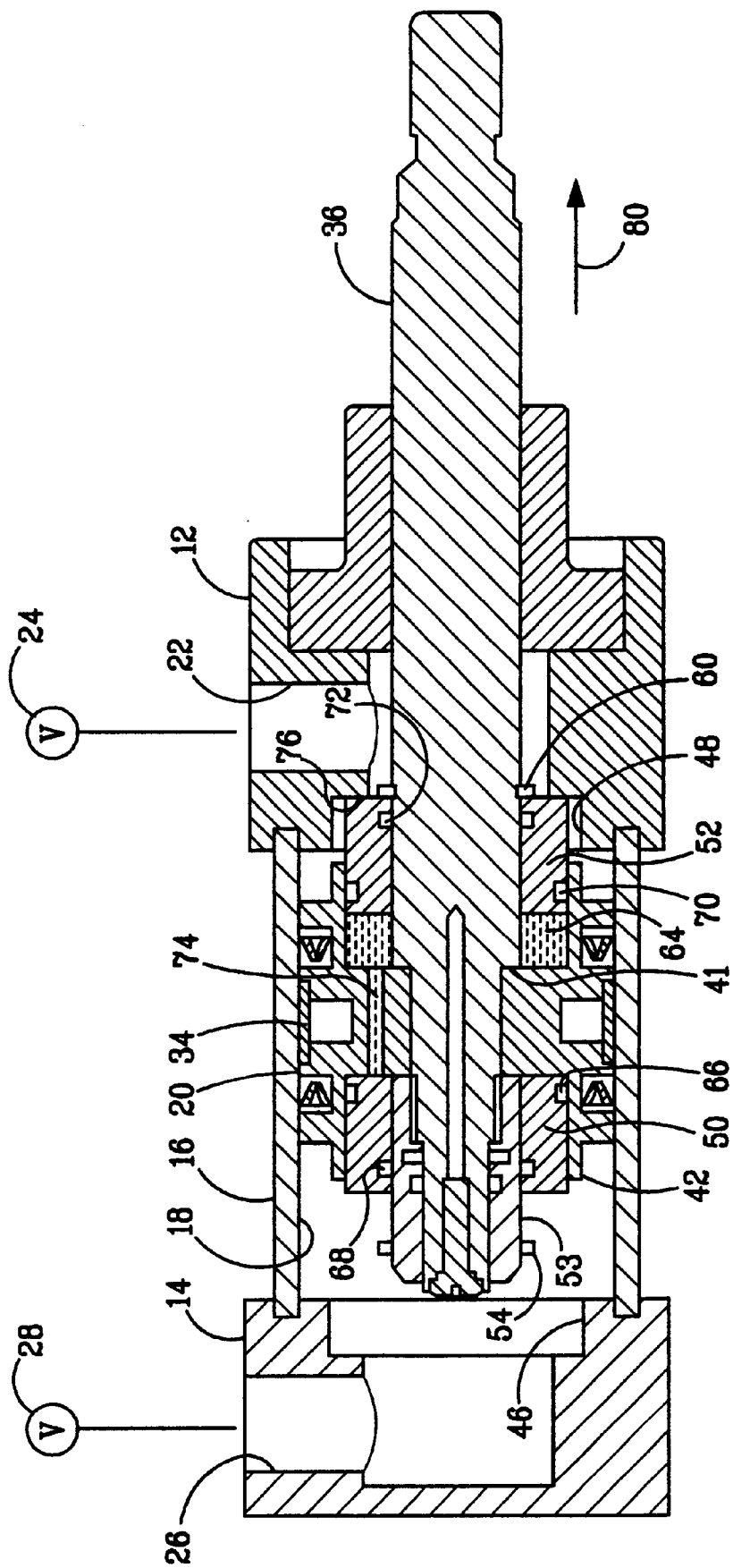
FIG. 2 is a sectional view of the cylinder showing a shock piston at the point of initiation of the cushioning phase of the stroke.
Figure 3:
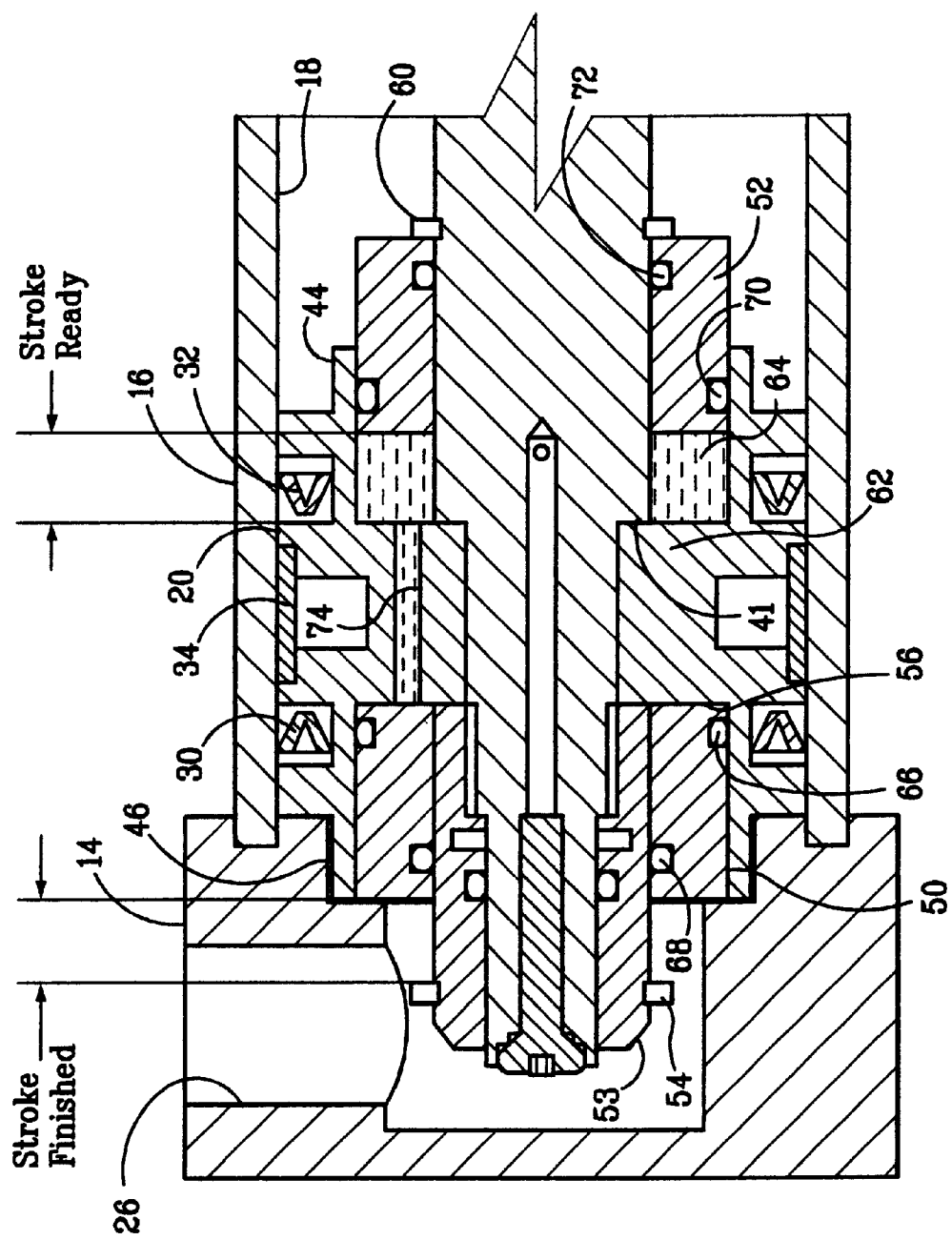
FIG. 3 illustrates the pneumatic piston completing its stroke toward the cap.
Figure 4:
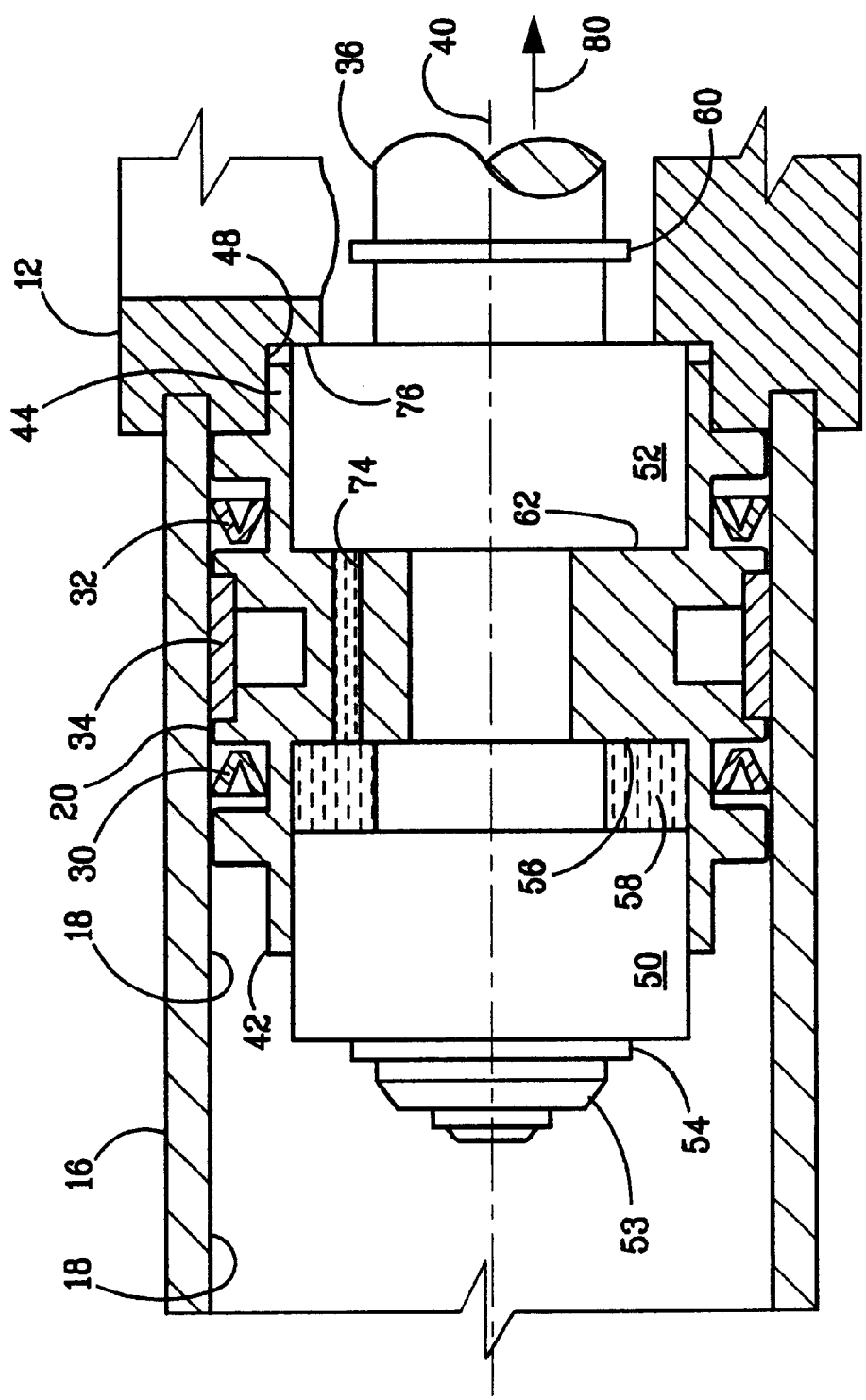
FIG. 4 illustrates the position of the pneumatic piston at the end of its stroke toward the cylinder head with the hydraulic fluid metered from one cushioning chamber to the other cushioning chamber.

Referring to FIGS. 2–4, barrel 16 has an internal air chamber 18. A pneumatic piston 20 is slidably mounted in chamber 18 between the head and the cap. The head has an internal passage 22 with appropriate valve means 24 for permitting air to pass into and out of chamber 18. Similarly, the cap has passage means 26 with suitable control valve means 28 for controlling the passage of air to and from the air chamber as the piston is reciprocating.

The pneumatic piston has conventional annular piston seals 30 and 32 and an annular wear ring 34 slidably engaged with barrel 16. Pneumatic piston 20 is mounted on a piston rod 36, which is movable with the piston along an axis 40. Piston 20 abuts shoulder 41 on the piston rod. The piston rod is typically adapted to be connected to a load, not shown, to provide a conventional air cylinder function.

The pneumatic piston has a pair of cylindrical axial extensions 42 and 44 (FIG. 4) which are slidably receivable toward a pair of recesses 46 and 48 in the cap and the head, respectively. Hydraulic shock pistons 50 and 52 are slidably movable in extensions 42 and 44, respectively, as pneumatic piston 20 is being reciprocated.

An elongated lock nut 53, forms an extension of the piston rod, and is threadably mounted on the end of the piston rod to clamp the pneumatic piston between shoulder 41 and the lock nut.

Rear shock piston 50 is axially slidably moveable on the lock nut between a retaining ring 54, and an internal wall 56 of the pneumatic piston. In the position illustrated in FIG. 4, when shock piston 50 is separated from piston wall 56, a hydraulic cushioning chamber 58 is formed which is either expanded or collapsed depending upon the direction the shock piston is moving with respect to wall 56.

Similarly, front shock piston 52 is slidably mounted on the piston rod, its axial motion being limited by a retaining ring 60 and internal wall 62 of the pneumatic piston. When shock piston 52 is spaced from wall 62, a hydraulic cushioning chamber 64 is formed as best shown in FIG. 3.

Annular seals 66 and 68 provide fluid-tight seals between shock piston 50, cylindrical extension 42, and lock nut 53, respectively. Similarly, a pair of annular seals 70 and 72 provides fluid-tight seals between shock piston 52, cylindrical extension 44 and the piston rod, respectively.

In use, pressurized air from a source, not shown, reciprocates the pneumatic piston alternately in one direction toward. the cylinder cap and then in the other direction toward the cylinder head. The piston rod moves with the pneumatic piston to move a load, not shown.

A hydraulic metering passage 74 fluidly connects hydraulic cushioning chamber 58 and hydraulic cushioning chamber 64. The size of the metering passage is chosen to control the fluid flow rate between the two hydraulic cushioning chambers, the friction of the passage of the hydraulic oil absorbing the energy of the load approaching the end of the stroke of the pneumatic piston.

FIG. 2 shows the shock pistons in their positions just before front shock piston 52 is moved by contact with recess 48 in cylinder head 12. Rod 36 has advanced rapidly without restriction of the front shock piston 52 until the location shown in FIG. 2. At this point, front shock piston 52 abuts the inside of the front cap (head) of the cylinder at 76. As piston rod 36 and the pneumatic piston continue to travel to the right, front shock piston 52 forces the hydraulic fluid out of cushioning chamber 64 on the right, through the orifice (metering passage) 74 and into chamber 58 on the left. This causes rear shock piston 50 to move to the left on the piston rod until piston 50 abuts retaining ring 54.

FIG. 4 shows the final result with front shock piston 52 at the end of its stroke and cushioning chamber 64 fully collapsed. The rear shock piston is at the beginning of its stroke and cushioning chamber 58 is fully charged. In this fashion, if the rear shock piston is "ready", then the front shock piston is at end of its stroke and vice versa.

As the piston rod moves to the left, the piston rod, the two shock pistons and the pneumatic piston move to the left until shock piston 50 enters recess 46 and abuts cap 14. The piston rod continues its movement toward the cap, as shock piston 50 forces the hydraulic fluid from chamber 58, through the metering passage into chamber 64. This hydraulic metering causes the pneumatic piston to gradually move toward the right on the piston rod until shock piston 52 abuts retaining ring 60.

Figure 5:
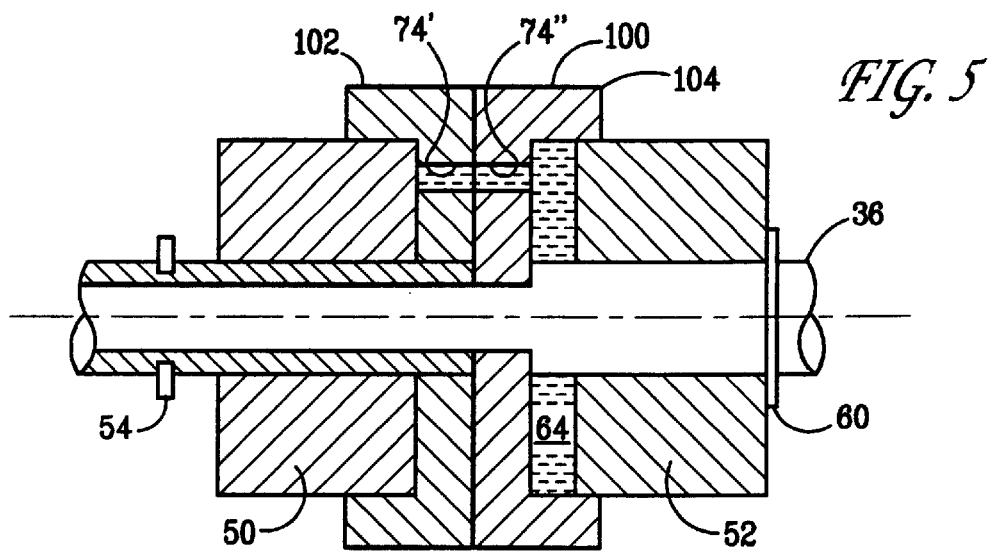
FIG. 5 illustrates another embodiment of the invention with an adjustable metering passage employing a rotatable piston half and a stationary piston half.

FIG. 5 illustrates a pneumatic piston 100 for adjusting the flow rate of the hydraulic fluid passing from one hydraulic cushioning chamber to the other. In this case, pneumatic piston 100 is formed into sections 102 and 104. The two sections move together in a power stroke, however, they are relatively rotatable about the axis of piston rod 36. Section 104 is retained by any suitable means in a non-rotatable position with respect to piston rod 36, and section 102 is rotatable with respect to section 104 to adjust the flow through metering orifice 74'.

Figure 6:
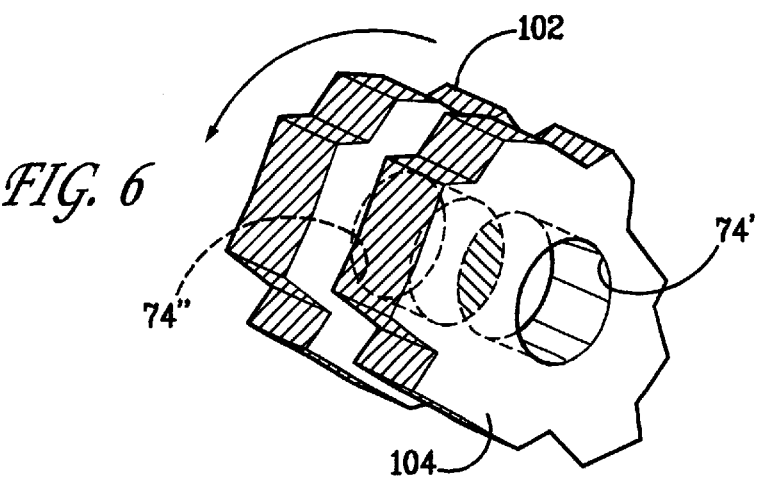
FIG. 6 is a sectional view showing the manner in which the metering passage size is adjusted.

FIG. 6 is a sectional view showing metering orifice 74'. Metering orifice 74' is rotated about the piston rod axis to meter, or partially block selectively the flow rate of the hydraulic fluid between the two hydraulic cushioning chambers.

Figure 7:
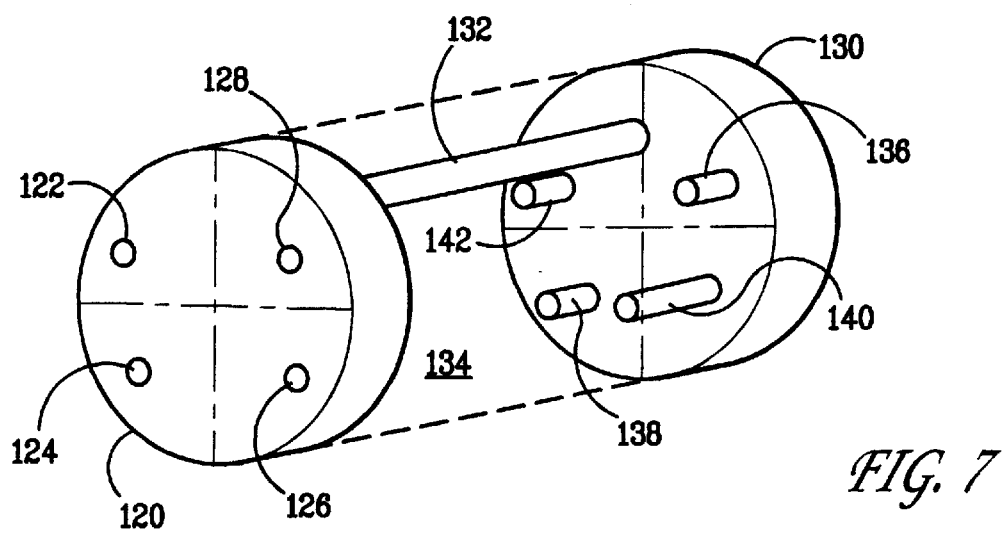
FIG. 7 is a perspective view showing still another method of metering the cushioning fluid using multiple orifices (passages).

FIG. 7 illustrates still another method for adjusting the passage of hydraulic fluid between the two hydraulic chambers in the form of a pneumatic piston 120 having a plurality of metering passages 122, 124, 126 and 128. Shock piston 130 is movable toward pneumatic piston 120 along an anti-rotation rod 132. Hydraulic chamber 134 is between shock piston 130 and pneumatic piston 120.

As the pneumatic piston approaches the shock piston, a plurality of different length pins 136, 138, 140 and 142, carried by the shock piston, and aligned with the metering passages enter the metering passages, progressively restricting the hydraulic fluid flow passing from hydraulic chamber 134 through passages 122, 124, 126, and 128. Long pin 140 slides into passage 126, followed by pin 138 sliding into passage 124, followed by pin 136 sliding into passage 128 and finally the shortest pin 142 sliding into passage 122. Additional metering pins and passages may be used.

Having described our invention, we claim:

1. A pneumatic cylinder with internal hydraulic dampening means, comprising:

a pneumatic cylinder barrel having a head on one end thereof and a cap on the opposite end thereof forming an internal pneumatic chamber, the head having a first passage means for passing air into and out of said pneumatic chamber, and the cap having a second passage means for passing air into and out of said pneumatic chamber;

a piston rod disposed in the pneumatic chamber so as to be axially movable therein, the piston rod extending outwardly of the head for receiving an impact force;

a pneumatic piston mounted on the piston rod in the pneumatic chamber so as to be axially movable with the piston rod in response to air passing into said pneumatic chamber;

the pneumatic piston having a cushioning structure facing at least one of the ends of the cylinder barrel;

a shock piston slidably moveable on the piston rod and engageable with the cushioning structure to form a cushioning chamber;

the pneumatic piston having an internal hydraulic metering passage fluidly connected to the cushioning chamber;

a charge of a hydraulic fluid filling the cushioning chamber and the metering passage such that as the pneumatic piston approaches one of the ends of the cylinder barrel, the hydraulic fluid from the cushioning chamber passes through the metering passage, the metering passage being so sized as to exert a resistance to the passage of the hydraulic fluid therethrough, thereby cushioning the motion of the pneumatic piston at the end of a stroke; and the metering passage comprising the pneumatic piston having a first orifice and a second orifice, and the shock piston having a first pin of a first length aligned with the first orifice and a second pin of a second, lesser length aligned with the second orifice, the first pin being receivable in the first orifice to restrict fluid passage through the metering passage, and the second pin being receivable in the second orifice to provide a further flow restriction through the metering passage at a different location of the pneumatic piston along a stroke.

2. A pneumatic cylinder with internal hydraulic dampening means, comprising:

a pneumatic cylinder barrel having a head on one end thereof and a cap on the opposite end thereof, forming an internal pneumatic chamber, the head having a first passage means for passing air into and out of said pneumatic chamber, and the cap having a second passage means for passing air into and out of said pneumatic chamber;

a piston rod disposed in the pneumatic chamber so as to be axially moveable in a first direction towards said cap and in the opposite direction toward said head, the piston rod extending outwardly of the head for receiving an impact force;

a pneumatic piston mounted on the piston rod in the pneumatic chamber so as to be axially moveable with the piston rod in response to air passing into said pneumatic chamber;

a hydraulic piston member;

a hydraulic cylinder member cooperating with the hydraulic piston member to form a hydraulic chamber;

a charge of hydraulic fluid in said hydraulic chamber;

a metering passage fluidly connected to said hydraulic chamber; comprising:

one of said members forming a part of said pneumatic piston so as to be movable therewith, whereby as the pneumatic piston moves within the pneumatic chamber, said one of said members moves with respect to the other of said members to move the hydraulic fluid through said metering passage from the hydraulic chamber so as to resist the movement of the pneumatic piston as it approaches the end of a pneumatic piston stroke;

said one of said members having a plurality of metering passages, and including a first pin and a second pin aligned with and receivable into respective ones of the plurality of metering passages, the first pin having a first length and the second pin having a shorter, second length disposed such that as the pneumatic piston approaches the end of a stroke, the first pin enters one of said passages to close same and thereby block passage of hydraulic fluid therethrough, and upon further motion of the pneumatic piston, the second pin enters a second of the metering passages to further retard the motion of the pneumatic piston.

3. A pneumatic cylinder with internal hydraulic dampening means, comprising:

a pneumatic cylinder barrel having a head on one end thereof and a cap on the opposite end thereof, forming an internal pneumatic chamber, the head having a first passage means for passing air into and out of said pneumatic chamber, and the cap having a second passage means for passing air into and out of said pneumatic chamber;

a piston rod disposed in the pneumatic chamber so as to be axially moveable in a first direction towards said cap and in the opposite direction toward said head, the piston rod extending outwardly of the head for receiving an impact force;

a pneumatic piston mounted on the piston rod in the pneumatic chamber so as to be axially moveable with the piston rod in response to air passing into said pneumatic chamber;

a hydraulic piston member;

a hydraulic cylinder member cooperating with the hydraulic piston member to form a hydraulic chamber;

a charge of hydraulic fluid in said hydraulic chamber;

a metering passage fluidly connected to said hydraulic chamber; comprising:

one of said members forming a part of said pneumatic piston so as to be movable therewith, whereby as the pneumatic piston moves within the pneumatic chamber, said one of said members moves with respect to the other of said members to move the hydraulic fluid through said metering passage from the hydraulic chamber so as to resist the movement of the pneumatic piston as it approaches the end of a pneumatic piston stroke;

said one of said members having a first metering orifice and the other of said members having a second metering orifice, aligned with the first metering orifice, said one of said members being moveable with respect to the other of said members from a first position in which a first portion of the second metering orifice is blocked to partially restrict hydraulic flow therethrough, and a second position in which a greater portion of the second metering orifice is blocked to change the rate of hydraulic flow therethrough.

4. A pneumatic cylinder as defined in claim 3, in which said one of said members is rotatable about an axis defining the direction of flow of a hydraulic fluid passing through the second office.

5. A pneumatic cylinder with internal hydraulic dampening means, comprising:

a pneumatic cylinder barrel having a head on one end thereof and a cap on the opposite end thereof forming an internal pneumatic chamber, the head having a first passage means for passing air into and out of said pneumatic chamber, and the cap having a second passage means for passing air into and out of said pneumatic chamber;

a pneumatic piston mounted in the pneumatic chamber so as to be axially movable in a stroke in a first direction toward said cap and in the opposite direction toward said head, in response to air passing into said pneumatic chamber, and means connected to the piston for receiving an impact force;

the pneumatic piston having a first cushioning structure facing the head, and a second cushioning structure facing the cap;

a first shock piston slidably moveable in the pneumatic chamber and engageable with the first cushioning structure to form a first cushioning chamber;

a second shock piston slidably movable in the pneumatic chamber and engageable with the second cushioning structure to form a second cushioning chamber;

the pneumatic piston having a hydraulic metering passage connecting the first cushioning chamber and the second cushioning chamber;

a charge of a hydraulic fluid disposed in the first cushioning chamber, the second cushioning chamber and the metering passage such that as the pneumatic piston is moved in at least one of said directions, one of said shock pistons urges the hydraulic fluid from the first cushioning chamber through the metering passage toward the second cushioning chamber, the metering passage being so sized as to exert a resistance to the passage of the hydraulic fluid therethrough, thereby cushioning a motion of the pneumatic piston in response to an impact force; and said metering passage comprising the pneumatic piston having a first orifice and a second orifice, and at least one of the shock pistons having a first pin of a first length aligned with the first orifice and a second pin of a second, lesser length aligned with the second orifice, the first pin being receivable in the first orifice to restrict fluid passage through the metering passage, and the second pin being receivable in the second orifice to provide a further flow restriction through the metering passage at a different location of the pneumatic piston along a stroke.

6. A pneumatic cylinder with internal hydraulic dampening means, comprising:
- a pneumatic cylinder barrel having an internal pneumatic chamber, and passage means for passing air into and out of said pneumatic chamber;
- a pneumatic piston mounted in the pneumatic chamber so as to be axially moveable therein in response to air passing into said pneumatic chamber, and means connected to the piston for receiving an impact force;
- the pneumatic piston having a cushioning structure;
- a shock piston slidably moveable in the pneumatic chamber and engageable with the cushioning structure to form a cushioning chamber;
- the pneumatic piston having an internal hydraulic metering passage fluidly connected to the cushioning chamber;
- a charge of a hydraulic fluid disposed in the cushioning chamber, and the metering passage such that as the pneumatic piston is moved in response to an impact force, the hydraulic fluid from the cushioning chamber passes through the metering passage, the metering passage being so sized as to resist the passage of the hydraulic fluid therethrough, thereby cushioning a motion of the pneumatic piston caused by an impact force; and the metering passage comprising the pneumatic piston having a first orifice and a second orifice, and the shock piston having a first pin of a first length aligned with the first orifice and a second pin of a second, lesser length aligned with the second orifice, the first pin being receivable in the first orifice to restrict fluid passage through the metering passage, and the second pin being receivable in the second orifice to provide a further flow restriction through the metering passage at a different location of the pneumatic piston along a stroke.

* * * * *